(12) United States Patent
Gerstel et al.

(10) Patent No.: US 11,245,768 B2
(45) Date of Patent: Feb. 8, 2022

(54) SYSTEM AND METHOD FOR NETWORK MIGRATION WITH MINIMAL TRAFFIC IMPACT

(71) Applicant: SEDONASYS SYSTEMS LTD, Raanana (IL)

(72) Inventors: Ornan Gerstel, Tel Aviv (IL); Moty Cohen, Elkana (IL); Assaf Nitzan, Haifa (IL)

(73) Assignee: SEDONASYS SYSTEMS LTD, Raanana (IL)

( * ) Notice: Subject to any disclaimer, the term of this patent is extended or adjusted under 35 U.S.C. 154(b) by 0 days.

(21) Appl. No.: 17/048,624

(22) PCT Filed: May 21, 2020

(86) PCT No.: PCT/IL2020/050557
§ 371 (c)(1),
(2) Date: Oct. 19, 2020

(87) PCT Pub. No.: WO2020/240539
PCT Pub. Date: Dec. 3, 2020

(65) Prior Publication Data
US 2021/0203730 A1     Jul. 1, 2021

Related U.S. Application Data

(60) Provisional application No. 62/853,074, filed on May 27, 2019.

(51) Int. Cl.
*G06F 15/173*     (2006.01)
*H04L 29/08*     (2006.01)

(52) U.S. Cl.
CPC .................. *H04L 67/148* (2013.01)

(58) Field of Classification Search
CPC .................................................. H04L 67/148
See application file for complete search history.

(56) References Cited

U.S. PATENT DOCUMENTS

2004/0042509 A1   3/2004  Gallant et al.
2008/0306986 A1   12/2008 Doyle, Sr.
(Continued)

OTHER PUBLICATIONS

Alcatel. "Mission-Critical Communications Networks for Power Utilities," MKT2014087121 EN Sep. 1-16, 2014, [retrieved on Jul. 27, 2020]. Retrieved from the Internet: <URL: https:1/www.tmcnet.com/tmclwhitepapersldocumentslwhitepapers/2014110693-migrating-telepro ection-application-ipmpls-networks .pdf pp. 1-15.

*Primary Examiner* — Ryan J Jakovac
(74) *Attorney, Agent, or Firm* — Lee & Hayes, P.C.

(57) ABSTRACT

Migrating data traffic from legacy networks to packet networks by inserting a first circuit emulation device (CEM) at a first endpoint and a second circuit emulation device (CEM) at a second endpoint of a connection in the legacy network, duplicating data traffic provided to the first CEM by routing one copy of the data traffic over the connection in the legacy network to the second CEM and one copy of the data traffic over a packet network from the first CEM to a comparison server, duplicating data traffic provided to the second CEM over the legacy network from the first CEM by routing one copy of the data traffic to customer communication equipment and one copy of the data traffic to the comparison server, comparing the data traffic routed to the comparison server and validating that the packet network can be used to replace the connection in the legacy network.

17 Claims, 11 Drawing Sheets

(56) References Cited

U.S. PATENT DOCUMENTS

| | | |
|---|---|---|
| 2011/0128954 A1* | 6/2011 | Veenstra ............. H04L 65/1026 |
| | | 370/352 |
| 2012/0257527 A1 | 10/2012 | Jorgensen |
| 2013/0148503 A1 | 6/2013 | Hutchison et al. |
| 2017/0031804 A1* | 2/2017 | Ciszewski ............... H04L 67/02 |
| 2017/0149607 A1 | 5/2017 | Bultema et al. |
| 2018/0124210 A1 | 5/2018 | Mosko |
| 2019/0215241 A1* | 7/2019 | Ben Ami ............ H04L 41/0853 |

* cited by examiner

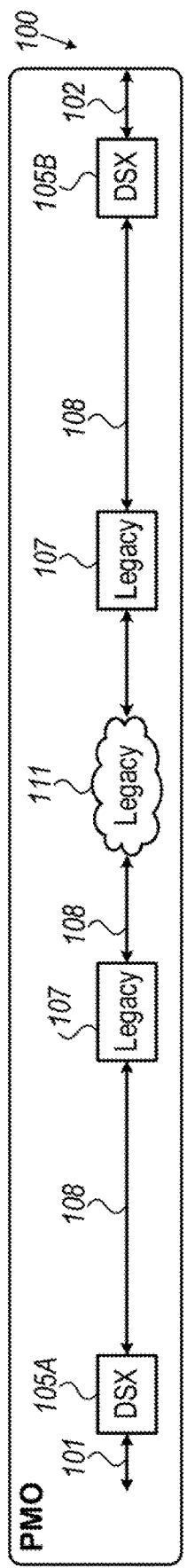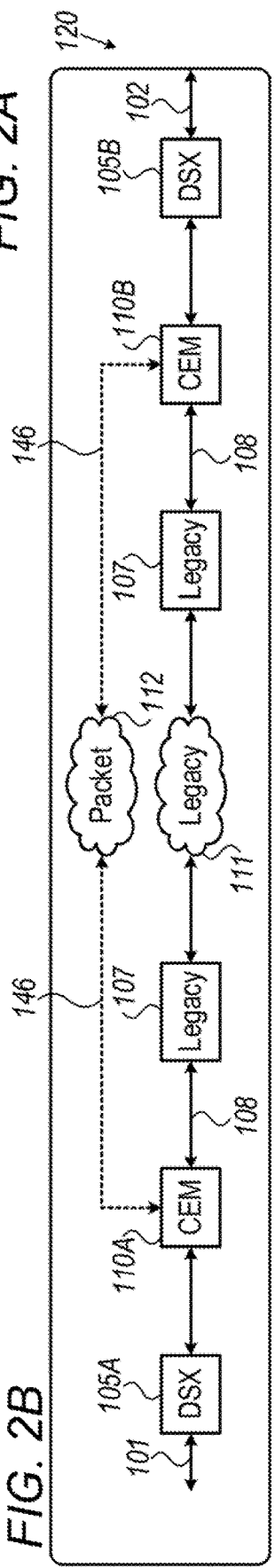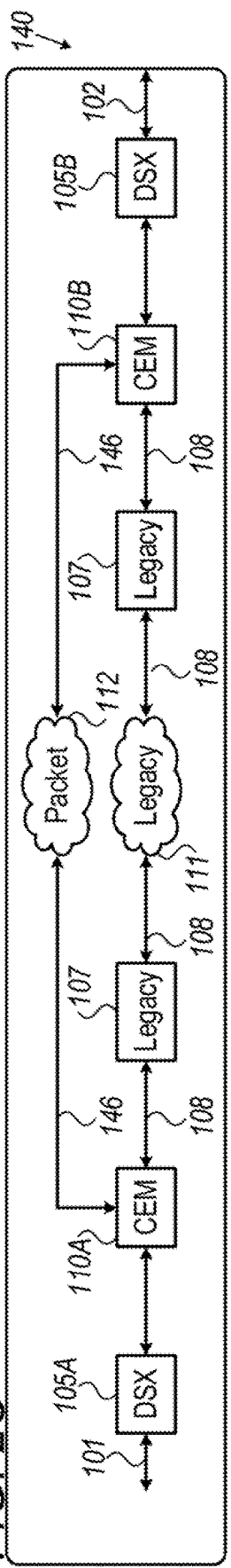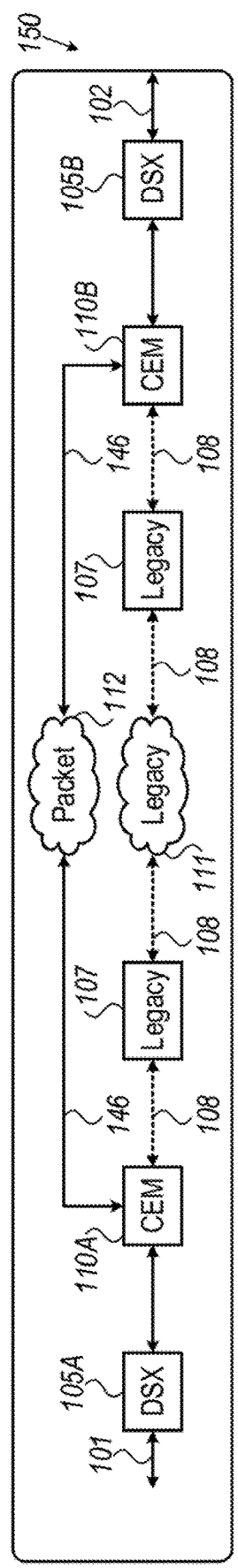

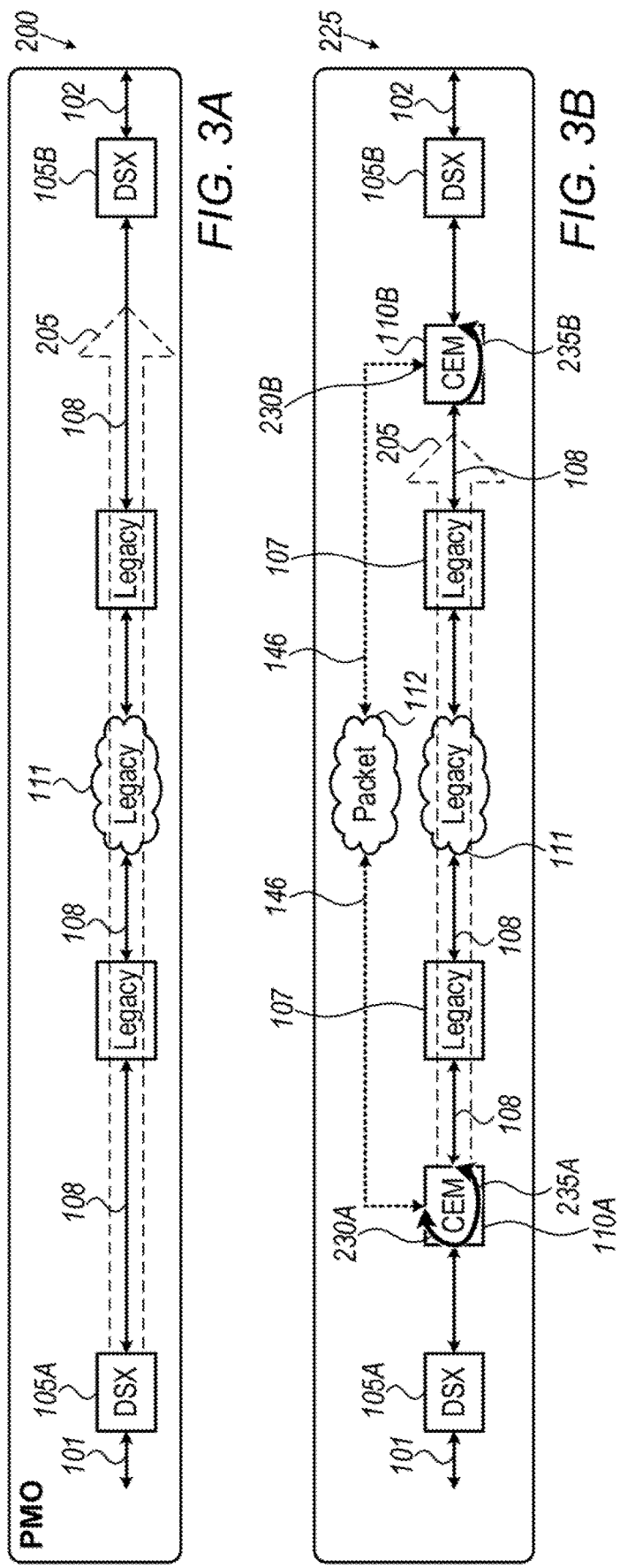

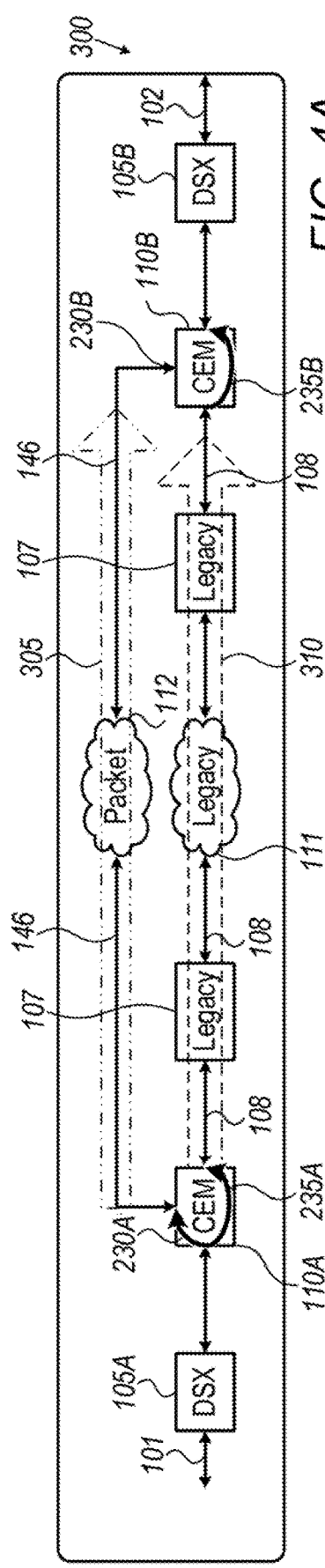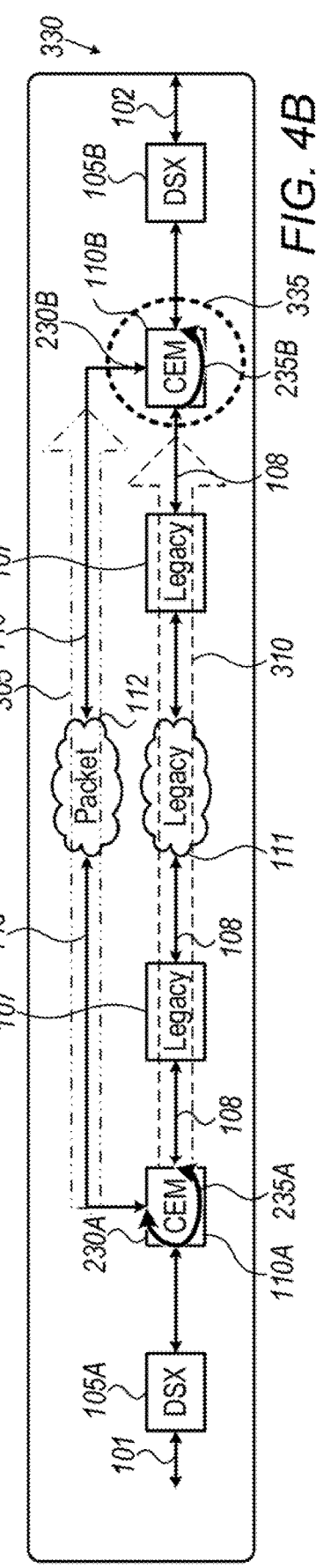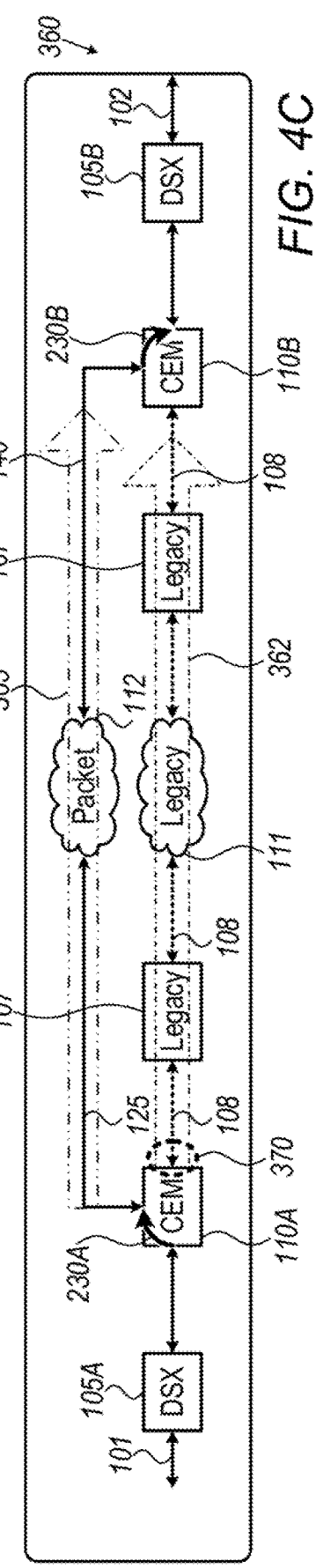

SYSTEM AND METHOD FOR NETWORK MIGRATION WITH MINIMAL TRAFFIC IMPACT

FIELD OF THE INVENTION

The present invention relates to data transmission over communication networks, and more specifically to network migration with minimal traffic impact.

BACKGROUND OF THE INVENTION

In older data communication systems using switched circuit technology such as plesiochronous digital hierarchy (PDH) or time division multiplexing (TDM) in legacy telephony systems, for example, telephone calls and/or data packets are transmitted typically between fixed or predefined end-to-end connections in the network. However, telecommunication carrier companies have been upgrading the older data communication systems to newer packet data communication systems where the routing of the data packets over the IP and optical communication systems may be determined from the IP headers in the data packet. As a result, central offices (CO) of the telecommunication companies may currently relay data over both the older legacy networks as well as newer packet and optical networks.

FIG. 1 schematically illustrates a block diagram 10 of exemplary configuration of network elements in a legacy central office (CO) between customer communication equipment 15 in the legacy CO with other central offices 65. Customer data equipment 15 may be coupled at a first end of the exemplary data links to equipment of other central offices 65 at a second end of the exemplary data links.

In block diagram 10, customer communication equipment 15 may be coupled to a main distribution frame (MDF) 20 via DS0 or DS1 signaling schemes and data rate. The data links between MDF 20 to a DSX-1-T1 DS1 (digital cross connect) device 28 may be via a class 5 voice switch 26, a D4 Channel Bank 24, or a device 22 with DSL (Digital Subscriber Loop), ADSL (asymmetric DSL), and/or ISDN (integrated services digital network).

In block diagram 10, the data may be routed from DSX-1-T1 DS1 device 28 over a first path to an M13 MUX device 30 over a DS1 link to a DSX-3 T3 DS3 device 40 over a DS3 link. The data may be also routed from DSX-1-T1 DS1 device 28 over a second path over a DS1 link to a NDCS1/0 device 32 (e.g., network data center and communication services) coupled to WDCS3/1 device 34 (e.g., wireless distributed communication system) over a DS1/DS3 link. The data may be further coupled from WDCS3/1 device 34 to DSX-3 T3 DS3 device 40 over a DS3/STS link and/or to LGX device 45 (e.g., light guide cross connects) over an OCx link. The data may be also routed from DSX-1-T1 DS1 device 28 over a third path from DSX-1-DS1 device 28 to WDCS3/1 device 34 over a DS1 link to DSX-3 T3 DS3 device 40 and/or LGX device 45 over an OCx link (e.g., optical carrier level).

In block diagram 10, the data may be coupled from DSX-3 T3 DS3 device 40 to ADM 56 (e.g., add-drop multiplexer) and to another central office 65 over an OCx link. The data may be also coupled from DSX-3 T3 DS3 device 40 to a BDCS 3/3 device 50 (e.g., backup domain controller system) over a DS3 link and to an LGX device 55. The data may be coupled from LGX 45 to BDCS 3/3 device 50 over an OCx link and to LGX 55 over an OCx link.

In block diagram 10, the data may be coupled from LGX 55 over an OCx link to equipment at other central offices 65 via ADM 58, DWDM ROADM 60 (e.g., Dense Wavelength Division Multiplexing-Reconfigurable Optical Add/Drop Multiplexers), or DWDM LH 62 (e.g., long haul).

In upgrading the legacy CO devices or equipment as shown in FIG. 1 to newer packet network equipment, routing data from the legacy networks to the newer packet network may incur a penalty in traffic during the upgrade. Moreover, the central offices may have legacy network equipment that is powered up and operational, but no longer transferring data as the data gets routed over the newer IP and optical packet networks.

Thus, it may be desirable to have a system and a method for network migration with minimal traffic impact and for identifying unused legacy equipment (e.g., old gear), which may be subsequently turned off and removed.

SUMMARY

An aspect of an embodiment of the disclosure, relates to migration of data traffic from a legacy networks to a packet network using pairs of circuit emulation devices to validate replacement of connections in the legacy network with connections in the packet network.

There is thus provided according to an exemplary embodiment of the disclosure, a method of migrating data traffic from legacy networks to packet networks, comprising:

Inserting a first circuit emulation device at a first endpoint and a second circuit emulation device at a second endpoint of a connection in the legacy network;

Duplicating data traffic provided to the first circuit emulation device by routing one copy of the data traffic over the connection in the legacy network to the second circuit emulation device and one copy of the data traffic over a packet network from the first circuit emulation device to a comparison server;

Duplicating data traffic provided to the second circuit emulation device over the legacy network from the first circuit emulation device by routing one copy of the data traffic to customer communication equipment and one copy of the data traffic to the comparison server;

Comparing the data traffic routed to the comparison server;

Validating responsive to the comparing that the packet network can be used to replace the connection in the legacy network; and Responsive to the validating diverting the data traffic from the connection in the legacy network to a connection from the first circuit emulation device to the second circuit emulation device in the packet network.

In an exemplary embodiment of the disclosure, the comparison server is located at the second circuit emulation device. Alternatively, the comparison server is located remote from the first circuit emulation device and the second circuit emulation device and connected to the first circuit emulation device and second circuit emulation device over the packet network. In an exemplary embodiment of the disclosure, after diverting removing legacy devices that formed the connection in the legacy network. Optionally, a user is notified if the validating fails. In an exemplary embodiment of the disclosure, the second endpoint in the legacy network is reconnected to a different position in the legacy network if the validating fails. Optionally, injecting an alarm indication signal into the connection in the legacy network. In an exemplary embodiment of the disclosure, identifying time slots, ports, cards, shelves chassis and other network elements of the legacy network for removal based on the injecting.

There is further provided according to an exemplary embodiment of the disclosure, a system for migrating data traffic from legacy networks to packet networks, comprising:

A first circuit emulation device and a second circuit emulation device;

A comparison server;

Wherein the first circuit emulation device, the second circuit emulation device and the comparison server are configured to perform the following:

Inserting the first circuit emulation device at a first endpoint and the second circuit emulation device at a second endpoint of a connection in the legacy network;

Duplicating data traffic provided to the first circuit emulation device by routing one copy of the data traffic over the connection in the legacy network to the second circuit emulation device and one copy of the data traffic over a packet network from the first circuit emulation device to the comparison server;

Duplicating data traffic provided to the second circuit emulation device over the legacy network from the first circuit emulation device by routing one copy of the data traffic to customer communication equipment and one copy of the data traffic to the comparison server;

Comparing the data traffic routed to the comparison server;

Validating responsive to the comparing that the packet network can be used to replace the connection in the legacy network; and Responsive to the validating diverting the data traffic from the connection in the legacy network to a connection from the first circuit emulation device to the second circuit emulation device in the packet network.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

FIG. 2A schematically illustrates a first connection state for data traffic traversing a legacy network between a first endpoint to a second endpoint, in accordance with some embodiments of the present invention;

FIG. 2B schematically illustrates a second connection state for data traffic traversing a legacy network, but not a packet network between a first endpoint and a second endpoint, in accordance with some embodiments of the present invention;

FIG. 2C schematically illustrates a third connection state for data traffic duplicated to both a legacy network and a packet network between a first endpoint and a second endpoint, in accordance with some embodiments of the present invention;

FIG. 2D schematically illustrates a fourth connection state for data traffic routed away from a legacy network, but traversing a packet network between a first endpoint and a second endpoint, in accordance with some embodiments of the present invention;

FIG. 3A illustrates an arrow showing the direction of data traffic from a first endpoint to a second endpoint, in accordance with some embodiments of the present invention;

FIG. 3B schematically illustrates a connection state where circuit emulation (CEM) devices are placed along a connection path, in accordance with some embodiments of the present invention;

FIG. 4A schematically illustrates a connection state where a CEM copies a data stream from a first endpoint to a first data stream to traverse a connection path in a packet network and a second data stream to traverse a connection path in a legacy network, in accordance with some embodiments of the present invention;

FIG. 4B schematically illustrates a connection state where a CEM compares a first data stream to a second data stream after both data streams traverse different connection paths, in accordance with some embodiments of the present invention;

FIG. 4C schematically illustrates a connection state where the data traffic between a first endpoint and a second endpoint are routed over a connection path in a packet network, in accordance with some embodiments of the present invention;

DETAILED DESCRIPTION OF THE INVENTION

Figure 1:
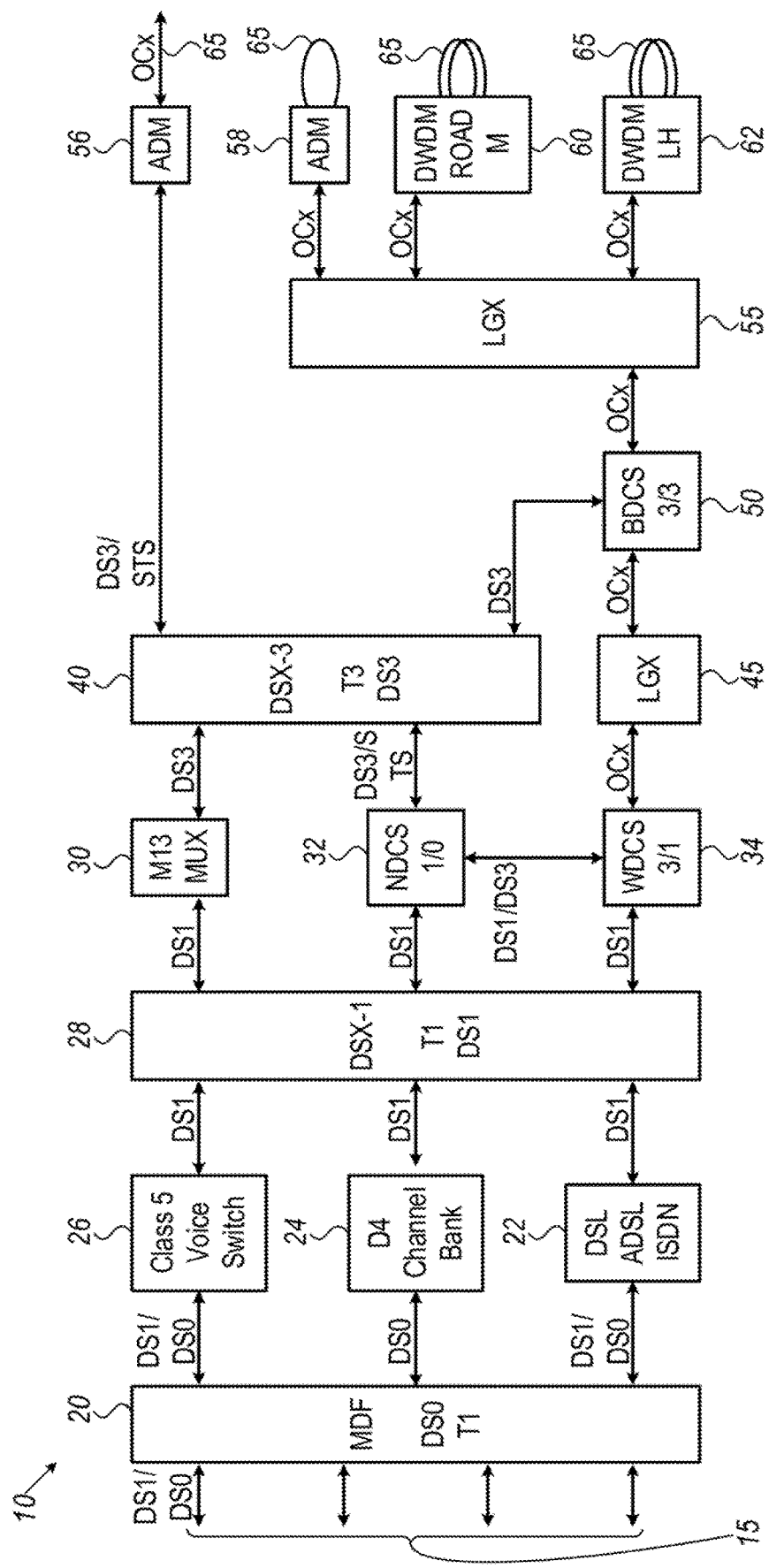
FIG. 1 schematically illustrates a block diagram of exemplary configuration of network elements in a legacy central office (CO) between customer communication equipment in the legacy CO with other central offices.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuitry have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information nontransitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Embodiments of the present invention described herein relate to systems and methods for migrating data traffic from legacy networks, such as time division multiplexing (TDM) networks, to packet networks with a minimal impact on the data traffic. Data signals traversing through circuits in older legacy networks, such as T1, T3, E1 and E3, for example, may be adapted to newer packet networks. Migration of services from the legacy network to the packet network may utilize circuit emulation technology (CEM) whereby CEM devices may be placed at both the first and the second endpoints of a circuit.

The terms "circuit" and "connection" as used herein may be used interchangeably and may refer to a path taken by data traffic in a network from a first endpoint to a second endpoint through any number of network devices and/or gear, such as end-to-end paths connecting customer sites. The data traffic may be unidirectional or bidirectional. On the other hand, the term "circuitry" may refer to electronic circuitry used devices and/or equipment in the network. The term "link" may be used herein to refer to a connection between adjacent elements.

In some embodiments of the present invention, the CEM device may be configured to duplicate, or copy, data traffic routed over both the packet and legacy networks at a first endpoint and to compare the copied data packets received at a second endpoint of the packet and legacy networks as described hereinbelow to verify if the data traffic through a legacy circuit arrives to a known port in the packet network. This may be verified in the CEM device at the second endpoint of the circuit by comparing the copied traffic generated by the CEM device at the first endpoint. The copied data traffic may traverse circuits both in the legacy and the packet networks and compared in the CEM device near the second endpoint. If the CEM device at the second endpoint validates that the original and the copied data traffic are the same, the data traffic may be then switched or migrated from the legacy network to the packet network.

Service providers may have an inventory system, or maintain a document or a mapping, such as an inventory document, all of which may include a listing of a plurality of data connections traversing equipment or gear over different paths throughout the legacy network. Over time, some or many of these paths may not be in use anymore, but the inventory document may not have been updated accordingly with new or defunct data paths in the legacy network, such that the data path listing in the inventory document may be inaccurate.

Thus, when a service provider decides to migrate the services from the legacy network to the packet network, location of old services and their connections need to be understood. If not, the migration process may be prone to error causing a circuit to be misconnected in the migrated packet network. As a result, a lot of costly manual work for updating or validating the connection information in the inventory document, for example, may need to be performed so as to understand the old connections in the legacy network before the equipment in the legacy network may be decommissioned when the data traffic and services are routed into the new network.

The embodiments of the present invention described herein solves this technical problem by ensuring that the misconnections are identified and discovered, and by allowing the identification of the endpoints of the connections in spite of wrong or inaccurate inventory data.

In some embodiments of the present invention, once the data traffic is diverted from the old legacy network to the new packet network during migration, a maintenance signal may be injected at the first endpoint into the legacy data path to determine whether old equipment in the legacy path may be removed without impact on the data traffic, in spite of possible inaccurate mapping entries in the invention document.

FIGS. 2A-2F schematically illustrate five connections states during the migration of data traffic from a legacy network 111 to a packet network 112, in accordance with some embodiments of the present invention. Throughout the disclosure, as in FIGS. 2A-2E shown herein below, solid arrows denote a link carrying a signal routed through it, and a dotted arrow denotes a physically connected link with no signal routed over it (e.g., in some cases, a link that had a signal routed away from it)

FIG. 2A schematically illustrates a first connection state 100 for data traffic traversing legacy network 111 between a first endpoint 101 to a second endpoint 102, in accordance with some embodiments of the present invention. FIG. 2A illustrates the preset mode of operation (PMO) in the legacy mode of first connection state 100. A user may use an inventory document defining connection path 108 between legacy devices 107 at first endpoint 101 coupled to a first digital cross-connect (DSX) 105A and legacy devices 107 coupled to a second DSX 105B at second endpoint 102. As an example, just merely for clarity and not by way of limitation of the embodiments taught herein, first endpoint 101 may be located in a central office in New York City and second endpoint 102 in Chicago, for example.

FIG. 2B schematically illustrates a second connection state 120 for data traffic traversing legacy network 111, but not through packet network 112 between endpoints 101 and 102, in accordance with some embodiments of the present invention. The user may insert GEM devices 110 (110A, 110B) into connection path 108. First CEM device 110A at first endpoint 101 may be configured to route the data traffic at first endpoint 101 both over a connection path 146 over packet network 112 and over a connection 108 over legacy network ill. A second CEM device 110B at second endpoint 102 may be configured to receive both the routed data traffic over the two paths from both legacy network 111 and packet network 112, and to compare the data traffic from the two paths to detect end-to-end connectivity in packet network 112.

FIG. 2C schematically illustrates a third connection state 140 for data traffic duplicated to both legacy network 111 and packet network 112 between endpoints 101 and 102, in accordance with some embodiments of the present invention. Second CEM device 110B may compare the two copies to verify that the data traffic over the two paths are the same.

FIG. 2D schematically illustrates a fourth connection state 150 for data traffic routed away from legacy network 111, but traversing packet network 112 between endpoints 101 and 102, in accordance with some embodiments of the present invention. Here first CEM device 110A may be configured to route the data traffic away from connection path 108 (e.g., now dotted arrow) over legacy network 111 to packet network 112 over connection path 146, so as to migrate the data traffic to the new packet network after second CEM device 110B validates the correct end-to-end connectivity.

Figure 2E:
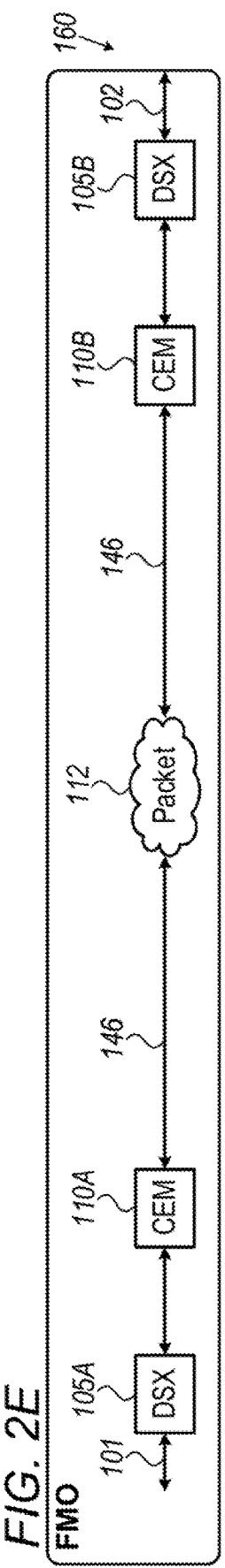
FIG. 2E schematically illustrates a fifth connection state for data traffic traversing a packet network between a first endpoint and a second endpoint, in accordance with some embodiments of the present invention

FIG. 2E schematically illustrates a fifth connection state 160 for data traffic traversing packet network 112 between first endpoint 101 and second endpoint 102, in accordance with some embodiments of the present invention. FIG. 2E schematically illustrates the final mode of operation (FMO) after having routed the data traffic over connection path 146 through packet network 112. The old gear or legacy devices 107, once identified as described hereinbelow, may then be removed from connection path 108 between first endpoint 101 and second endpoint 102.

It should be noted that exemplary end-to-end connection path 108 shown in FIG. 2A may be one of a plurality of possible connection paths through the network devices in legacy network 111 Similarly, end-to-end connection path 146 shown in FIG. 2E may be one of a plurality of possible connection paths through the network devices in packet network 112. In the case shown in FIGS. 2A-2E and throughout this disclosure, these exemplary connection paths 108 and 146 both start at first endpoint 101 and terminate on second endpoint 102.

In this case, a user using CEM 110 devices may verify that data traversing connection path 108 through legacy network 111 and connection path 146 through packet network 112 start on first endpoint 101 and end on second endpoint 102 in accordance with the embodiments described in the following figures. If not, CEM device 110B placed on different paths may be used to assess that if the path through the plurality of old gear in the legacy network and the new gear in the packet network have the same endpoints. In this manner, the data traffic may be migrated to be routed over to the new gear in the packet network.

Even though a portion of the data traffic may be migrated from old gear in the legacy network to new gear in the packet network, unmigrated data traffic may still use a portion of the old gear in the legacy network. However, whenever the data traffic is switched to the new gear, different methods that are taught hereinbelow may be used to assess whether a particular device of old gear is operating, but no longer supporting data traffic. In this case, the old gear may be decommissioned.

Figure 2F:
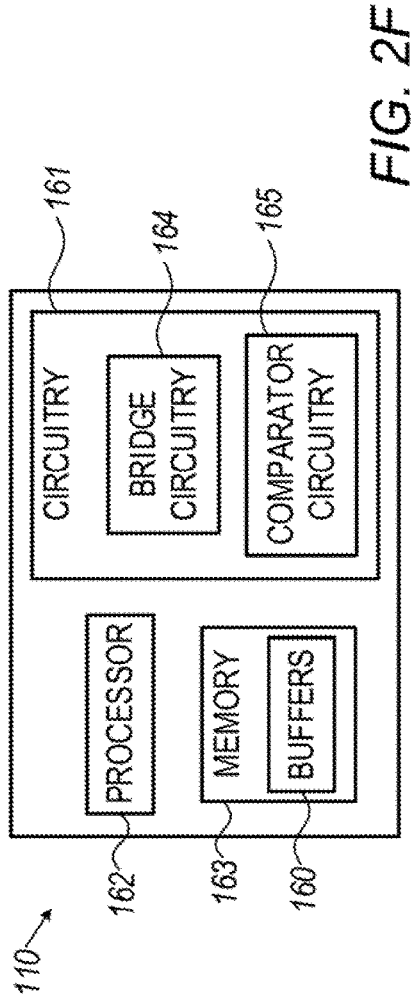
FIG. 2F is a block diagram of circuit emulation (CEM) device, in accordance with some embodiments of the present invention.

FIG. 2F is a block diagram of circuit emulation (CEM) device 110, in accordance with some embodiments of the present invention. CEM 110 may include a processor 162, a memory 163 including memory buffers 160, and circuitry 161 including bridge circuitry 164 for generating data stream replications (e.g., copies) and comparator circuitry 165 for comparing two or more data streams, such as by a bit-by-bit comparison of the two or more data streams, for example.

FIGS. 3A-3B schematically illustrates a connection state 200 routing data traffic traversing both over legacy network 111 and packet network 112 between endpoints 101 and 102, in accordance with some embodiments of the present invention. FIGS. 3A-3B illustrate the sub-steps of second connection state 120.

FIG. 3A illustrates an arrow 205 showing the direction of data traffic from first endpoint 101 to second endpoint 102, in accordance with some embodiments of the present invention. Although the data traffic is shown here flowing in one direction, this is merely for conceptually clarity and not by way of limitation of the embodiments taught herein. The data traffic may be bi-directional along data connection 108.

FIG. 3B schematically illustrates a connection state 225 where circuit emulation (CEM) devices 110 (110A, 110B) are placed along connection path 108, in accordance with some embodiments of the present invention. CEM device 110A may be placed near the first endpoint 101 and CEM device 110B may be placed near the second endpoint 102. CEM device 110A may be configured to replicate or copy the incoming data traffic to endpoint 101 in the direction of arrow 205 to two data signals 230A and 235A. Data signal 230A may be relayed over data connection 146 of packet network 112. Data signal 230B may be relayed over data connection 108 of legacy network 112. It should be noted to one skilled in the art that the placement of CEM devices 110A and 110B may be placed in the circuit at different times. However, only when both are in place, CEM 110B near second endpoint 102 may then compare the duplicated signals generated by CEM 110A.

In some embodiments of the present invention, CEM device 110 may include bridging circuitry 164 to generate the copies of the data traffic.

If the user knows the correct end-to-end connectivity of data connections 108 and 146 over both the legacy and packet networks are endpoints 101 and 102, the two replicated data signals 230A and 230B will arrive to CEM 110B at second endpoint 102 and will be identified by CEM 110B after having traversed packet network 112 and legacy network 112, respectively, as being the replicated signals 230A and 230B generated in CEM 110A at first endpoint 101. In connection state 225, service is still carried out over both packet network 112 and legacy network 111.

FIGS. 4A-4C schematically illustrate connection states for migrating and routing data traffic away from legacy network 111 and to packet network 112 between endpoints 101 and 102, in accordance with some embodiments of the present invention. Arrow 305 along packet network 112 and arrow 310 along legacy network 111 indicate the direction of traffic flow (e.g., from left to right).

FIG. 4A schematically illustrates a connection state 300 where CEM 110A copies a data stream from endpoint 101 to a first data stream 230A to traverse a connection path 146 in packet network 112 and a second data stream 235A to traverse a connection path 108 in legacy network 111, in accordance with some embodiments of the present invention. The first and second data streams arrive to CEM 110B, now referred to as first data stream 230B and second data stream 235B.

FIG. 4B schematically illustrates a connection state 330 where CEM 110B compares 335 data stream 235B to data stream 230B after both data streams traversed connection paths 108 and 146, in accordance with some embodiments of the present invention. Buffers 160 in memory 163 in CEM 110B may align the bit streams in first data stream 230B and second data streams 235B and processor 162 may compare the two bitstreams bit by bit for X bits, where X is an integer. If processor 162 determines that the two data stream copies are the same, such as in a bit-by-bit comparison, for example, CEM 110A may then start to route all of the service from first endpoint 101 to second endpoint 102 over connection path 146 in packet network 112 as shown below in FIG. 4C. If the two copies are not the same, processor 162 may issue an error message to a user over an output or communication device (not shown).

FIG. 4C schematically illustrates a connection state 360 where the data traffic between first endpoint 101 and second endpoint 102 are routed over connection path 146 in packet network 112, in accordance with some embodiments of the present invention. In connection state 360, CEM 110A now routes data traffic 230A over connection 146.

In some embodiments of the present invention, a maintenance signal, such as an alarm indication signal (AIS), may be injected through a port 370 along legacy connection path 108, or through a channel inside a port, in case the legacy connection uses only part of the port (e.g., a DS1 in a DS3). The maintenance signal may assist in the identification of ports (e.g., of old gear) which are no longer in use in the old network (e.g., legacy network 111) so as to update the inventory system (e.g., inventory document) when incomplete or incorrect. In other embodiments, no signal may be injected at port 370.

Figure 5:
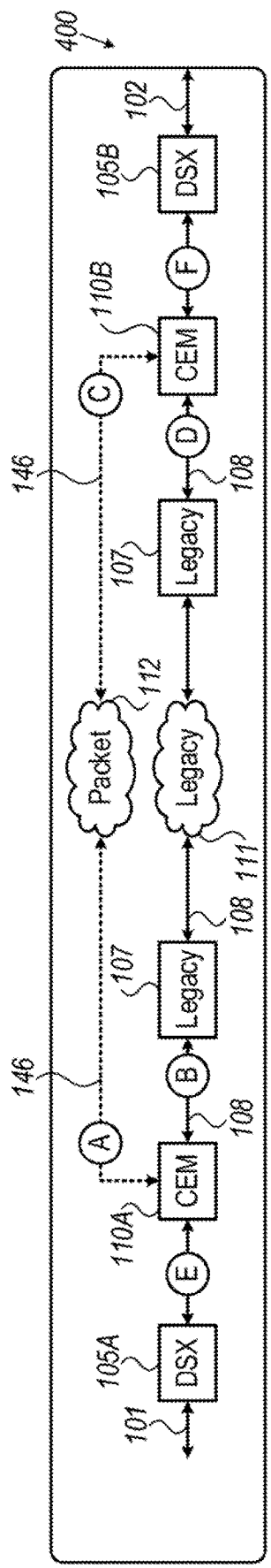
FIG. 5 schematically illustrates a connection state where the data traffic between a first endpoint and a second endpoint with indicia A-F indicated thereon for discovering misconnections, in accordance with some embodiments of the present invention.

FIG. 5 schematically illustrates a connection state 400 where the data traffic between first endpoint 101 and second endpoint 102 with indicia A-F indicated thereon for discovering misconnections, in accordance with some embodiments of the present invention. The methods for identifying port connections as described hereinabove may be used to identify patchcord misconnections (e.g., such as in the inventory document). These methods may be used to identify the following misconnections: (1) connecting CEM 110A to wrong new port at A; (2) connecting CEM 110A to wrong old port at B; (3) connecting CEM 110B to wrong new port at C; and (4) connecting CEM 110B to wrong old port at D. This approach does not detect misconnection of common ports of CEM 110A and 110B at E and F, respectively.

Figure 6:
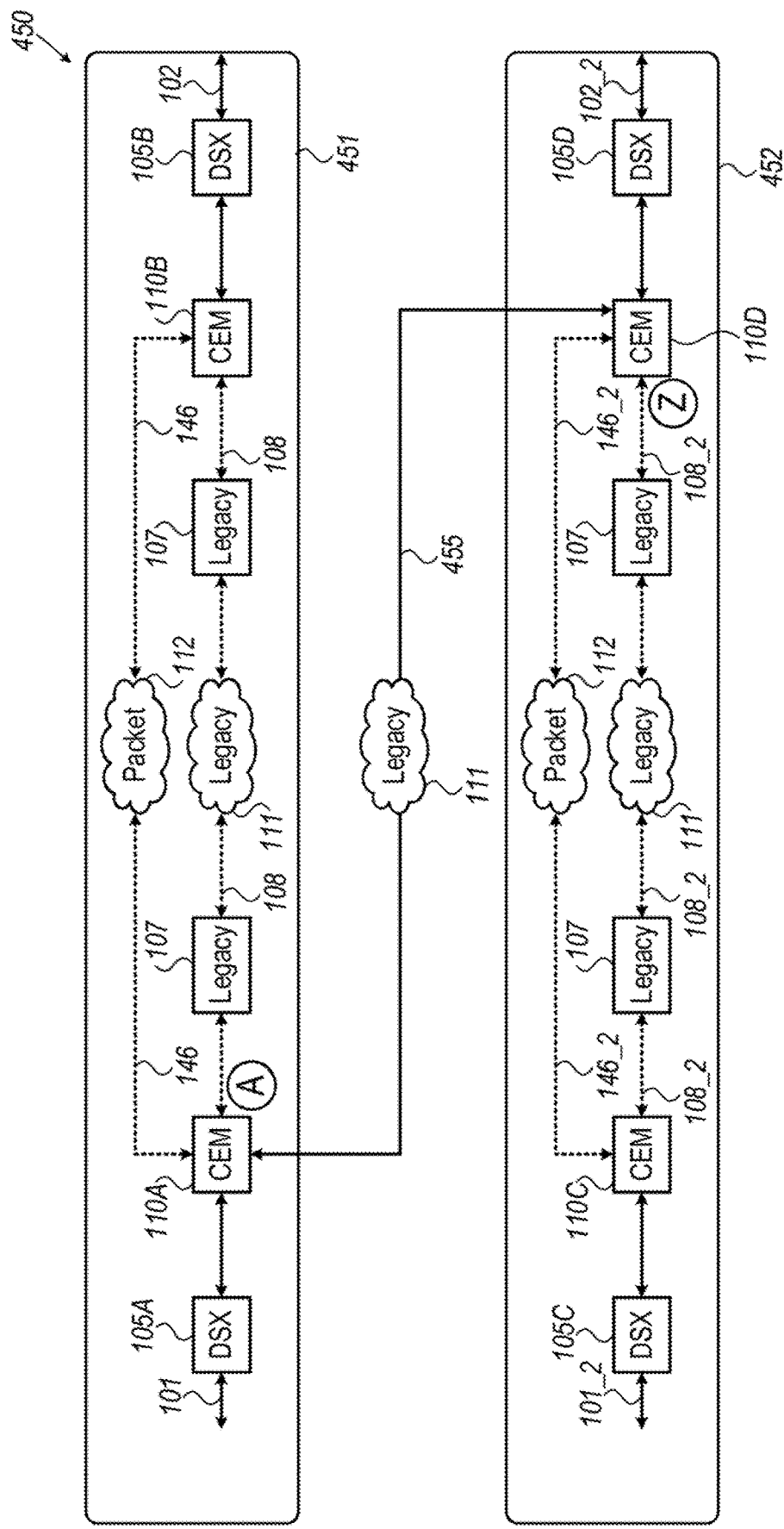
FIG. 6 schematically illustrates a connection state between two circuits with two respective sets of endpoints, in accordance with some embodiments of the present invention.

FIG. 6 schematically illustrates a connection state 450 between two circuits 451 and 452 with two respective sets of endpoints, in accordance with some embodiments of the present invention. First circuit 451 has first endpoint 101 and second endpoint 102, and second circuit 452 has a first endpoint 101_2 and a second endpoint 102_2. Since the inventory system may have the wrong documentation of the circuits, it may list two different endpoints than the actual (e.g., accurate) connections. However, the actual connection in this example is shown along a connection path 455. The scheme shown in FIG. 6 may be used to detect these issues and does not allow misconnections based on wrong inventory data.

In the example shown in FIG. 6, the inventory documents that circuit 451 and circuit 452 are connected between endpoints 101 and 102, and endpoints 101_2 and 102_2, respectively. However, in reality, circuit 101 at A is connected to circuit 2 at Z in legacy network 111 (e.g., connect via legacy network 111 along connection path 455 as shown). In this case, the system or controller (e.g., a central server or computing device not shown with a processor, memory, communication circuitry, and input/output devices) may configure the connections in packet network 112, but the two copies of the signals generated CEM 110A and CEM 110C will not match in CEM 110B and CEM 110D, respectively, so as to indicate to the user that the inventory connectivity data is not accurate for this case. This will prevent a misconnection after migration from the legacy network to the packet network. However, this approach does not identify the exact connection.

Figure 7:
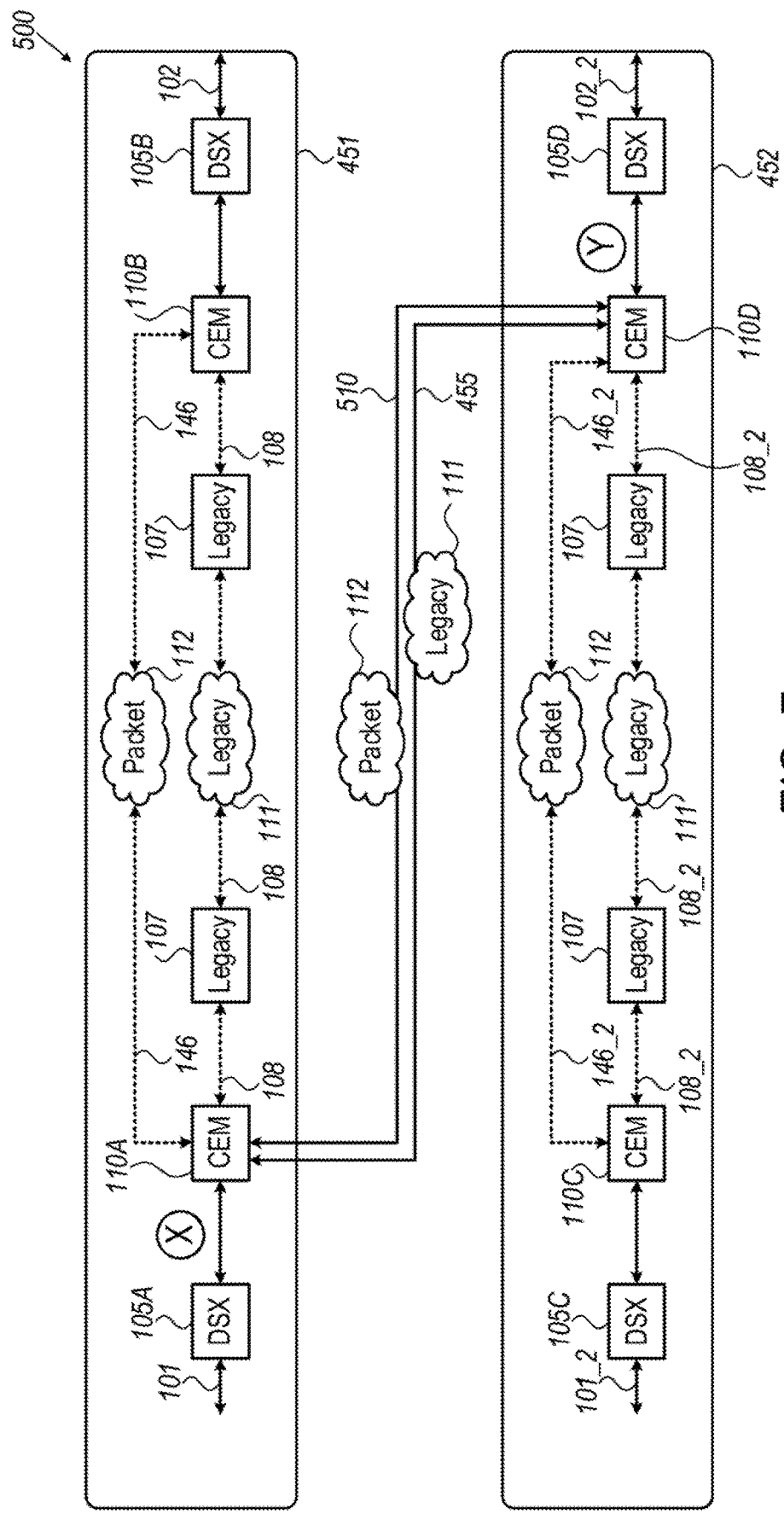
FIG. 7 schematically illustrates a connection state between two circuits with endpoints in a legacy network and a packet network properly identified, in accordance with some embodiments of the present invention.

FIG. 7 schematically illustrates a connection state 500 between two circuits 451 and 452 with endpoints in legacy network 111 and packet network 112 properly identified, in accordance with some embodiments of the present invention.

In order to identify the proper connectivity for the packet network when the inventory data is inaccurate, the system may search other candidate connections for the right connection. Searching for the right connection may be performed manually (e.g., a user moving CEM devices from test port to test port in the network) or automatically where a plurality of previously placed CEM devices may be queried, for example. The selected candidate connections may be based on heuristics, such as endpoints in the same office, for example, or by manual inspection of patchcord connectivity.

For candidate ports X and Y as shown in FIG. 7, the system may create the connections for the new network ports of their CEM devices (e.g., CEM 110A and CEM 110D) and may instruct CEM device 110D to compare the bit streams coming on a new connection 510 via packet network 112 to connection 455 on legacy network 111 as shown in the FIG. 7. If the bitstream comparisons are identical, the proper connection was found.

Figure 8:
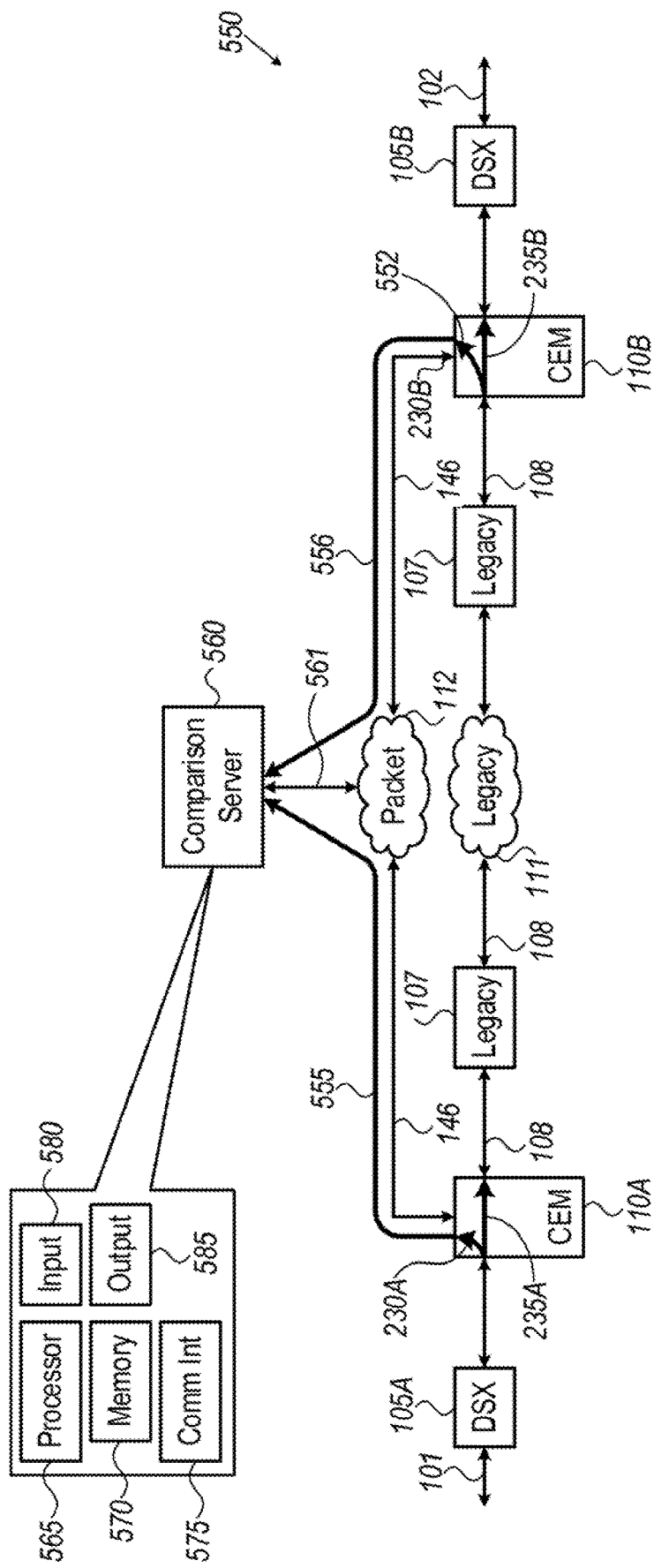
FIG. 8 schematically illustrates a system including a comparison server to compare bitstreams from a plurality of CEM devices, in accordance with some embodiments of the present invention.

FIG. 8 schematically illustrates a system 550 including a comparison server 560 to compare bitstreams from a plurality of CEM devices, in accordance with some embodiments of the present invention. Comparison server 560 may include a processor 565, a memory 570, an input device 580, an output device 585 and a communication circuitry and interface module 575 for communicating with network devices such as CEM 110 over the legacy and/or packet networks. Comparison server 560 may be connected to packet network 112 over a connection 561.

Some CEM devices may not include comparison circuitry 165, for example, for comparing bitstreams as previously described. An alternative solution is to generate a copy of the legacy signal at both ends of the circuit (e.g., a plurality of circuits in the legacy network with a respective plurality of endpoints) and send the resulting packets over connections paths 555 and 556 to comparison server 560 for comparing the bitstreams.

In some embodiments, the bitstream comparison may be performed without packet network 112 to validate the inventory data. In other embodiments, the bitstream comparison may be performed over a management network (if the management network has enough bandwidth).

Processor 565 may include one or more processing units, e.g. of one or more computers. Processor 565 may be configured to operate in accordance with programmed instructions stored in memory 570. Processor 565 may be capable of executing an application for comparing bitstreams from a plurality of CEM devices for validating connectivity.

Processor 565 may communicate with output device 585. For example, output device 585 may include a computer monitor or screen. Processor 565 may communicate with a screen of output device 585 to display connectivity information in the plurality of circuits in the legacy and/or packet networks. In another example, output device 585 may include a printer, display panel, speaker, or another device capable of producing visible, audible, or tactile output.

Processor 565 may communicate with input device 580. For example, input device 580 may include one or more of a keyboard, keypad, or pointing device for enabling a user to input data or instructions for operation of processor 565.

Processor 565 may communicate with memory 570. Memory 570 may include one or more volatile or nonvolatile memory devices. Memory 570 may be utilized to store, for example, programmed instructions for operation of processor 565, data or parameters for use by processor 565 during operation, or results of operation of processor 565.

In operation, processor 565 may execute a method for comparing bitstreams from a plurality of CEM devices for validating connectivity.

These apparatus variants described above are equally applicable to CEM device 110 as shown in FIG. 2E.

In some embodiments of the present invention, when a circuit is active, the bitstream in the circuit is likely to be unique and therefore allow for accurate identification of the correct connection endpoints. However, if a circuit is inactive then some kind of bitstream pattern that signifies an "empty signal" or "idle signal" may be sent over the connection path. In other embodiments, the circuit may be an active circuit including multiple sub-circuits (a channelized circuit), where each sub-circuit is empty. The embodiments may be configured to manage such patterns as well and treat them as "idle".

In some embodiments, in the bitstream comparison step with "idle signals", there may be less certainty that they represent the same circuit. As a result, the system may mark the validation of a circuit with a lower certainty validation. The system may recheck the circuit after a predefined time period to identify if the circuit is still idle. The system may store signatures of idle signals (e.g., in a memory) such as signals that are periodic and occurred more than once.

In some embodiments of the present invention, a method for the removal of old (legacy) gear may include: (1) marking ports as unused; (2) marking line cards as unused; (3) marking shelves as unused; and (4) marking chassis as unused.

The process for the removal of old gear may be hierarchical: (1) A port may be marked as unused if all the payloads (more than one, if channelized) are carrying an alarm indication signal (AIS) or other maintenance signals for more than a predefined time interval X; (2) Optionally, a channelized port in which all channels are set to AIS may be set to an unchannelized AIS so that it is visible when channelized into high containers (T1→T3→OC12); (3) A line card may be marked unused if all its ports are unused; (4) A shelf may be marked unused if all its line cards are unused; (5) A chassis may be marked unused if all its shelves are unused.

FIGS. 9A-9D schematically illustrate a scheme for a detection of empty network resources that may be removed from service in a legacy network, in accordance with some embodiments of the present invention. Each of the circuits in FIGS. 9A-9D may include DS1 circuits coupled to a wideband digital cross-connect unit (WDCS 3/1) 605, further coupled to a DS3 device 610. DS3 device 610 may include circuits 615. In some embodiments, each circuit 615 may represent, for example, a time slot in TDM signal. DS3 device 610 may be coupled to a digital signal cross-connect (DSX-3) 620 further coupled to a broadband digital cross-connect unit (BDCS 3/3) 630 followed by an optical circuit (OCx) fiber network 635.

It should be noted that all of the circuit devices such as CEM 110 are shown with one or two or three ports, for example, in the various figures shown herein. This is merely for conceptual clarity and not by way of limitation of the embodiments of the present invention described herein. Any number of ports, connection paths, devices, etc. may be used.

Figure 9A:
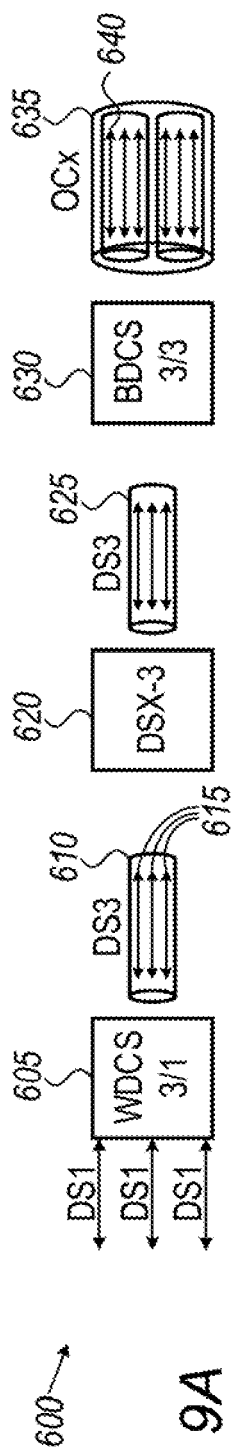
FIG. 9A schematically illustrates an exemplary plurality of links in a network where all links are in use by a plurality of connections, in accordance with some embodiments of the present invention.

FIG. 9A schematically illustrates an exemplary plurality of links 600 in a network where all links are in use by a plurality of connections, in accordance with some embodiments of the present invention. The connections are not explicitly shown in the figure.

Figure 9B:
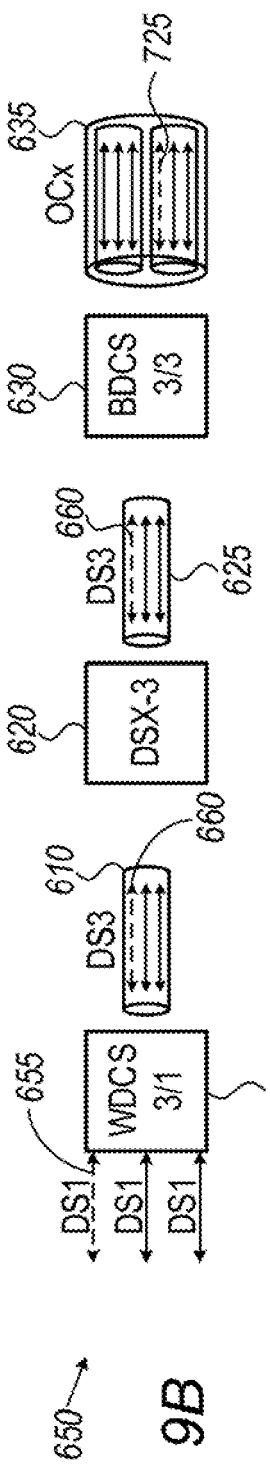
FIG. 9B schematically illustrates an exemplary plurality of links in a network where one DS1 circuit is in an AIS mode, in accordance with some embodiments of the present invention.

FIG. 9B schematically illustrates an exemplary plurality of links 650 in a network where one DS1 circuit is in an AIS mode, in accordance with some embodiments of the present invention. This circuit may use link 655, channel 660 (dotted arrow) in DS3 620, channel 660 in DS3 625, and a channel 725 in DS3 XXXX, which is multiplexed as a channel in OCx link 635. In some embodiments, the one unused circuit may be detected by injecting a maintenance signal or AIS signal, such as for example injection through port 370 along legacy connection path 108 to implement this process as illustrated in FIG. 4C as previously described. This AIS signal may be detected on each port of links 655, 620, 625. It may not be detected on the port of OCx link 635 since it is two levels "deep" in the multiplexing structure (a channel within a channel within a link).

Figure 9C:
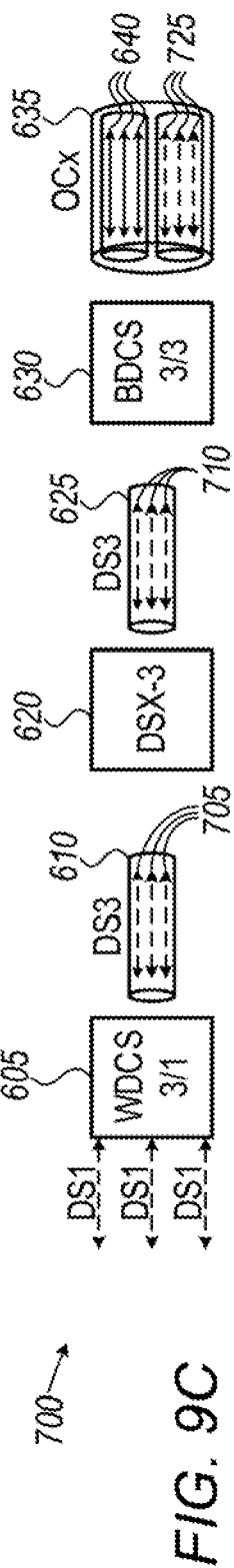
FIG. 9C schematically illustrates an exemplary plurality of links in a network where all DS1 channels in a DS3 link are placed in an AIS mode, in accordance with some embodiments of the present invention.

FIG. 9C schematically illustrates an exemplary plurality of links 700 in a network where all DS1 channels in a DS3 link are placed in an AIS mode, in accordance with some embodiments of the present invention. In this case, DS1 circuits 705 in DS3 610, DS1 circuits 710 in DS3 625 may be detected to be in an AIS mode and remain unused. However, circuits 725 in OCx 635 may not be visible in the OCx port of link 635.

Figure 9D:
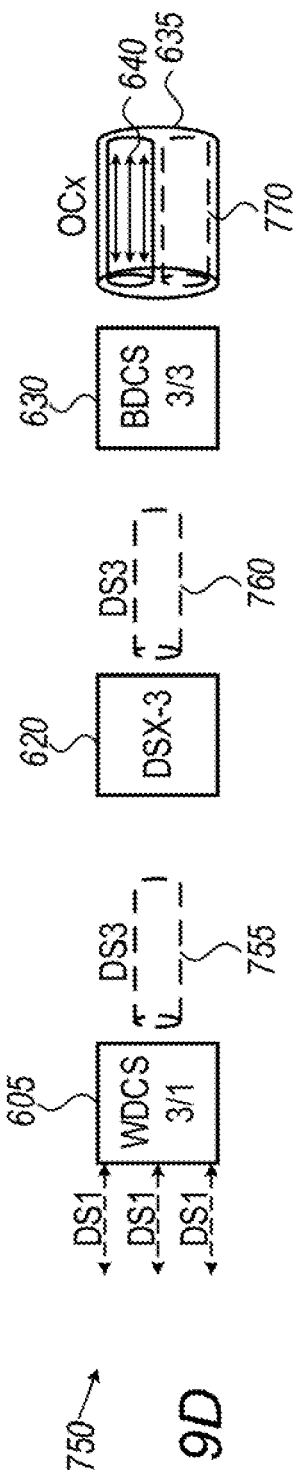
FIG. 9D schematically illustrates an exemplary plurality of links in a network where a DS3 link with all DS1 channels in AIS is placed in a DS3 level AIS mode.

FIG. 9D schematically illustrates an exemplary plurality of links 750 in a network where a DS3 link with all DS1 channels in AIS is placed in a DS3 level AIS mode, in accordance with some embodiments of the present invention. In this case the AIS of DS3 channel 770 in OCx link 635 may be detected on the port of the OCx link because it is one level deeper. Upon detecting that all channels within the entire set of links may be in an AIS mode and remain unused, such as DS3 755, DS3 760, and circuit 710 in OCx 640, all of these links may be placed in an AIS mode and/or decommissioned, thus removing old gear from the legacy network.

Figure 10A:
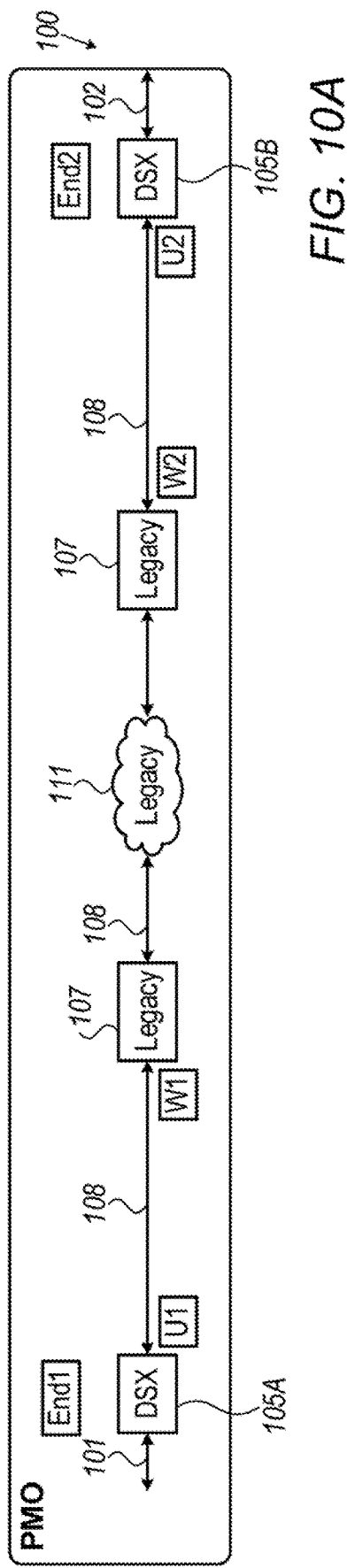
FIG. 10A schematically illustrates a connection state for data traffic traversing a legacy network between a first endpoint to a second endpoint with indicia U1 and W1, in accordance with some embodiments of the present invention.

FIG. 10A schematically illustrates a connection state for data traffic traversing a legacy network between a first endpoint to a second endpoint with indicia U1 and W1, in accordance with some embodiments of the present invention.

Figure 10B:
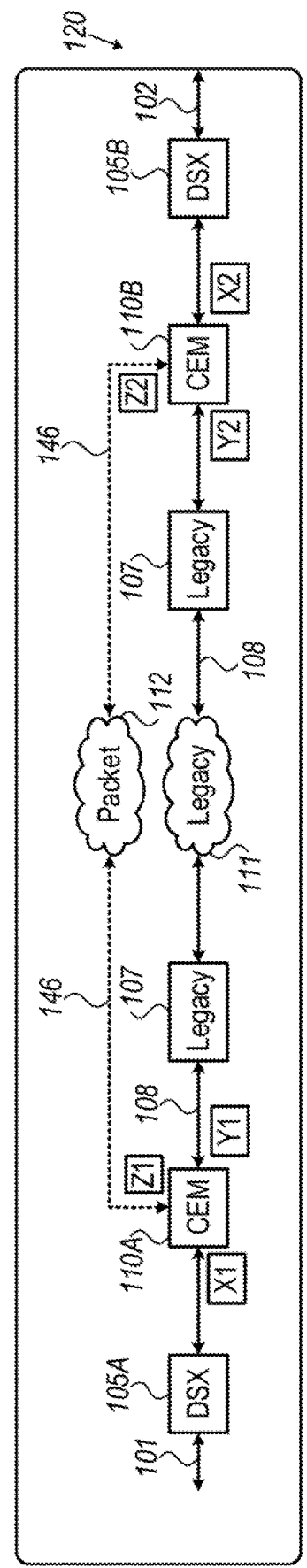
FIG. 10B schematically illustrates a connection state for data traffic traversing both a legacy network and a packet network between endpoints with indicia X1, Y1, and Z1, in accordance with some embodiments of the present invention.

FIG. 10B schematically illustrates a connection state for data traffic traversing both a legacy network and a packet network between endpoints with indicia X1, Y1, and Z1, in accordance with some embodiments of the present invention.

Embodiments of the present invention with reference to FIGS. 10A and 10B hereinbelow describe a system and a method for migrating services from old TDM technology (e.g., legacy network 111) to new packet network technology. The system and method may include an old network, a new network, CEM devices mediating between the old and new networks. The method, for example, may be implemented by the CEM devices that may include circuitry with a processor.

The method may be implemented by performing the following steps:
 (1) Selecting a circuit with two ends: end1 and end2, starting at client-facing port U1 and ending at port U2 (e.g., at end2).
 (2) Configuring the CEM device at end1 to copy the incoming signal from a designated TDM port X1 to two designated ports: TDM port Y1 and packet port Z1.
 (3) Configuring the CEM device to receive the incoming signal from port Y1 and relay it to port X1.
 (4) Inserting CEM device into a circuit, by disconnecting interface to the client (U1) from the old network port (W1), connecting U1 to X1 and W1 to Y1 thereby restoring the circuit path.
 (5) Connecting port Z1 to a new network port (e.g., connecting to the packet network).
 (6) Repeating steps (2) to (5) at end2 of the circuit (with ports U2, W2, X2, Y2 and Z2 respectively). This step may occur at a different time—uncoordinated with steps (2) to (5)

The method may be further implemented by performing the following steps:
 (7) Creating an emulation circuit on the new network connecting port Z1 to Z2 by configuring the device in the packet network.
 (8) At the CEM device 110A in end1, comparing the incoming bit streams from port Y1 and Z1. This may involve tuning the receive buffers for Z1 so that it aligns with Y1, and comparing N bits of both streams to determine they are identical.
 (9) If they are identical, configuring the CEM device to send the incoming signal from port Z1 to port X1.
 (10) If they are not identical, notify the user that end1 and end2 are not endpoints of the same circuit.
 (11) Manually or automatically search for the right endpoint by repeating steps (7)-(9) for Z1 and Zx (for x, an integer different than 2)
 (12) The search may rely on the inventory data using part of the data but not all of it:
   (a) Assuming that the inventory lists that a circuit starts from port P1 on device D1 in office O1 in city C1 (P1-D1-O1-C1) and goes to port P2 on device D2 in office O2 in city C2 (P2-D2-O2-C2)
   (b) If this fails validation, search for matches for other ports in the same device (Pi-D1-O1-C1 to Pj-D2-O2-C2)
   (c) If all combinations fail, search for matches for ports in the same office (Pi-Dk-O1-C1 to Pj-Dm-O2-C2) where i, k, j, m, n, and p indices are integers.
   (d) If all combinations fail, search for matches for ports in the same city (Pi-Dk-On-C1 to Pj-Dm-Op-C2)
 (13) Repeating steps (7)-(12) for end2

The method may be further implemented by performing the following steps:
 (14) Configure port Y1 and Y2 on the CEM devices at both ends to send a maintenance signal such as AIS.
 (15) Assess which devices in the old network have ports carrying the circuit sense AIS on their ports or on a timeslot in a higher bandwidth port.
 (16) If a port on an old device includes timeslots, all of which carry AIS, this port may be configured to send AIS.
 (17) If a port on an old device carries AIS or includes timeslots, all of which may carry AIS, this port may be turned off and is candidate for removal (as part of line cards and chassis that have ports that are all candidates for removal).

Embodiments of the present invention with reference to FIGS. 10A and 10B hereinbelow describe a system and a method for migrating services from old TDM technology (e.g., legacy network 111) to new packet technology network using a comparison server. The system and method may include a comparison server (e.g., comparison server 560), an old network, a new network, CEM devices mediating between the old and new networks. The method, for example, may be implemented by the CEM devices that may include circuitry with a processor.

The method may be implemented by performing the following steps:
 (1) Selecting a circuit with two ends: end1 and end2, starting at client-facing port U1 and ending at port U2 (e.g., at end2).
 (2) Configuring the CEM device at end1 to copy the incoming signal from a designated TDM port X1 to two designated ports: TDM port Y1 and packet port Z1.
 (3) Configuring the CEM device to receive the incoming signal from port Y1 and copy the signal to ports X1 and Z1.
 (4) Inserting CEM device into a circuit, by disconnecting interface to the client (U1) from the old network port (W1), connecting U1 to X1 and W1 to Y1 thereby restoring the circuit path.
 (5) Connecting port Z1 to a new network port (e.g., connecting to the packet network).
 (6) Repeating steps (2) to (5) at end2 of the circuit (with ports U2, W2, X2, Y2 and Z2 respectively).
 (7) Connecting a comparison server to the new network.

The method may be further implemented by performing the following steps:
 (8) Creating an emulation circuit on the new network connecting port Z1 to the comparison server by configuring the device in the packet network.
 (9) Creating an emulation circuit on the new network connecting port Z2 to the comparison server by configuring the device in the packet network.
 (10) In the comparison server, comparing the incoming bit streams from port Z1 and Z2.
 (11) If they are identical:
   (a) Creating an emulation circuit on the new network connecting port Z1 to Z2 by configuring the device in the packet network
   (b) configuring the CEM device at end1 to send the incoming signal from port Z1 to port X1 and the CEM device at end2 to send the incoming signal from port Z2 to port X2.

(12) If they are not identical, notify the user that end1 and end2 are not endpoints of the same circuit.

(13) Manually or automatically search for the right endpoint by repeating steps (7)-(9) for Z1 and Zx (for x, an integer different than 2)

(14) The search may rely on the inventory data using part of the data but not all of it:
  (a) Assuming that the inventory lists that a circuit starts from port P1 on device D1 in office O1 in city C1 (P1-D1-O1-C1) and goes to port P2 on device D2 in office O2 in city C2 (P2-D2-O2-C2)
  (b) If this fails validation, search for matches for other ports in the same device (Pi-D1-O1-C1 to Pj-D2-O2-C2)
  (c) If all combinations fail, search for matches for ports in the same office (Pi-Dk-O1-C1 to Pj-Dm-O2-C2) where i, k, j, m, n, and p indices are integers.
  (d) If all combinations fail, search for matches for ports in the same city (Pi-Dk-On-C1 to Pj-Dm-Op-C2)

(15) Repeating steps (8)-(14) for end2.

In some embodiments of the present invention, the comparison server may check if the compared signals correspond to "idle signals". This comparison may include the steps of:

(1) Storing known idle signals where multiple idle signals may exist depending on the equipment at the customer location (2) Comparing the signal from Z1 and Z2 to the idle signals.

(3) If one of the comparisons are identical to one of the idle signals or candidates for an idle signal, notify user that the certainty level of the match is lower.

(4) If one of the comparisons are identical to one of the candidates for an idle signal, mark this candidate as an idle signal (5) If not, check if the signals for Z1 or Z2 are periodic, indicating they may be idle signals. If one of them is periodic, store it as candidate for an idle signal.

In some embodiments of the present invention, the TDM technology may include PDH, SONET, and/or SDH.

In some embodiments of the present invention, the packet technology may include packet-optical (e.g., MPLS-TP), and/or routers (e.g., IP/MPLS).

In some embodiments of the present invention, the packet technology and protocols to carry the emulated circuit may be based on Structure-Agnostic TDM over Packet (SAToP), or Circuit Emulation over Packet (CEoP), or TDM Circuit Emulation over Packet (CEP-TDM), or Circuit Emulation Service over Packet-Switched Network (CESoPSN).

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method of migrating data traffic from legacy networks to packet networks, comprising:
   inserting a first circuit emulation device at a first endpoint and a second circuit emulation device at a second endpoint of a connection in a legacy network;
   duplicating first data traffic provided to the first circuit emulation device to result second data traffic;
   routing the first data traffic over the connection in the legacy network to the second circuit emulation device;
   replicating the second data traffic as first packets and routing the first packets over a packet network from the first circuit emulation device to a comparison server;
   receiving the first data traffic at the second circuit emulation device over the connection in the legacy network;
   duplicating the first data traffic provided to the second circuit emulation device over the legacy network from the first circuit emulation device to result in third data traffic;
   routing one of the first data traffic or third data traffic to customer communication equipment;
   replicating another of the first data traffic or the third data traffic as second packets and routing the second packets over the packet network to the comparison server;
   comparing the first packets and second packets at the comparison server;
   validating, based at least in part on the comparing the first packets and second packets, that the packet network can be used to replace the connection in the legacy network; and
   at least partly responsive to the validating, diverting subsequent data traffic from the connection in the legacy network to another connection from the first circuit emulation device to the second circuit emulation device in the packet network.

2. The method of claim 1, wherein the comparison server is located at the second circuit emulation device.

3. The method of claim 1, wherein the comparison server is located remote from the first circuit emulation device and the second circuit emulation device and connected to the first circuit emulation device and second circuit emulation device over the packet network.

4. The method of claim 1, wherein after diverting removing legacy devices that formed the connection in the legacy network.

5. The method of claim 1, wherein a user is notified if said validating fails.

6. The method of claim 1, wherein the second endpoint in the legacy network is reconnected to a different position in the legacy network if said validating fails.

7. The method of claim 1, further comprising injecting an alarm indication signal into the connection in the legacy network at the first circuit emulation device.

8. The method of claim 7, further comprising identifying time slots, ports, cards, shelves chassis and other network elements of the legacy network for removal based on said injecting.

9. A system for migrating data traffic from legacy networks to packet networks, comprising:
   a first circuit emulation device and a second circuit emulation device;
   a comparison server;

wherein the first circuit emulation device, the second circuit emulation device and the comparison server are configured to perform the following:

inserting a first circuit emulation device at a first endpoint and a second circuit emulation device at a second endpoint of a connection in a legacy network;

duplicating first data traffic provided to the first circuit emulation device to result second data traffic;

routing the first data traffic over the connection in the legacy network to the second circuit emulation device;

replicating the second data traffic as first packets and routing the first packets over a packet network from the first circuit emulation device to a comparison server;

receiving the first data traffic at the second circuit emulation device over the connection in the legacy network;

duplicating the first data traffic provided to the second circuit emulation device over the legacy network from the first circuit emulation device to result in third data traffic;

routing one of the first data traffic or third data traffic to customer communication equipment;

replicating another of the first data traffic or the third data traffic as second packets and routing the second packets over the packet network to the comparison server;

comparing the first packets and second packets at the comparison server;

validating, based at least in part on the comparing the first packets and second packets, that the packet network can be used to replace the connection in the legacy network; and at least partly responsive to the validating, diverting subsequent data traffic from the connection in the legacy network to another connection from the first circuit emulation device to the second circuit emulation device in the packet network.

10. The system of claim 9, wherein the comparison server is located at the second circuit emulation device.

11. The system of claim 9, wherein the comparison server is located remote from the first circuit emulation device and the second circuit emulation device and connected to the first circuit emulation device and second circuit emulation device over the packet network.

12. The system of claim 9, wherein after diverting removing legacy devices that formed the connection in the legacy network.

13. The system of claim 9, wherein a user is notified if said validating fails.

14. The system of claim 9, wherein the second endpoint in the legacy network is reconnected to a different position in the legacy network if said validating fails.

15. The system of claim 9, further comprising injecting an alarm indication signal into the connection in the legacy network at the first circuit emulation device.

16. The system of claim 15, further comprising identifying time slots, ports, cards, shelves chassis and other network elements of the legacy network for removal based on said injecting.

17. One or more non-transitory computer-readable media storing computer-executable instructions that, when executed by one or more processors, cause the one or more processors to perform operations comprising:

inserting a first circuit emulation device at a first endpoint and a second circuit emulation device at a second endpoint of a connection in a legacy network;

duplicating first data traffic provided to the first circuit emulation device to result second data traffic;

routing the first data traffic over the connection in the legacy network to the second circuit emulation device;

replicating the second data traffic as first packets and routing the first packets over a packet network from the first circuit emulation device to a comparison server;

receiving the first data traffic at the second circuit emulation device over the connection in the legacy network;

duplicating the first data traffic provided to the second circuit emulation device over the legacy network from the first circuit emulation device to result in third data traffic;

routing one of the first data traffic or third data traffic to customer communication equipment;

replicating another of the first data traffic or the third data traffic as second packets and routing the second packets over the packet network to the comparison server;

comparing the first packets and second packets at the comparison server;

validating, based at least in part on the comparing the first packets and second packets, that the packet network can be used to replace the connection in the legacy network; and at least partly responsive to the validating, diverting subsequent data traffic from the connection in the legacy network to another connection from the first circuit emulation device to the second circuit emulation device in the packet network.

* * * * *